United States Patent [19] [11] 4,149,308

Smith [45] Apr. 17, 1979

[54] METHOD OF FORMING AN EFFICIENT ELECTRON EMITTER COLD CATHODE

[75] Inventor: Bernard Smith, Neptune, N.J.

[73] Assignee: The United States of America as represented by the Secretary of the Army, Washington, D.C.

[21] Appl. No.: 861,147

[22] Filed: Dec. 16, 1977

[51] Int. Cl.[2] .......... B01J 17/00

[52] U.S. Cl. .......... 29/583; 29/572; 29/589; 204/192 P

[58] Field of Search .......... 29/572, 583, 589; 204/192 P

[56] References Cited

U.S. PATENT DOCUMENTS

| | | | |
|---|---|---|---|
| 3,811,953 | 5/1974 | Nozik | 29/572 |
| 3,815,223 | 6/1974 | Allison | 29/583 |
| 4,027,192 | 5/1977 | Hanok | 204/192 P |

*Primary Examiner*—W. Tupman

*Attorney, Agent, or Firm*—Nathan Edelberg; Sheldon Kanars; Roy E. Gordon

[57] ABSTRACT

An efficient electron emitter cold cathode is formed by first placing an N-type monocrystalline substrate of about 100 to about 500 microns in thickness in a furnace. The furnace is heated to about 850° C. to about 900° C. and an N-type layer of about 10 to 15 microns of $SnO_2$ is deposited onto the top surface of the substrate using a suitable carrier gas. Then, a P-type layer of about 10 microns of $SnO_2$ is deposited on the N-type layer. The furnace is then cooled at a rate of about 10° C. per minute to about 600° C. to form the emitter. The furnace is then cooled to room temperature and the emitter removed from the furnace. The emitter is subjected to etching and polishing to obtain a P-type layer of about 2 to 4 microns, and a nonreactive metal contact is then deposited on the P-type layer. The emitter is then completed by bonding a metal contact to the base of the N-type monocrystalline substrate.

29 Claims, No Drawings

METHOD OF FORMING AN EFFICIENT ELECTRON EMITTER COLD CATHODE

The invention described herein may be manufactured, used, and licensed by or for the Government for governmental purposes without the payment to me of any royalty thereon.

BACKGROUND OF THE INVENTION

This invention relates to a method of forming an efficient thin film tin-oxide electron emitter cold cathode.

It is known that tin oxide ($SnO_2$) is a cold electron source that does not require an active metal coating to achieve appreciable emission. Heretofore, the tin oxide cold cathode has been formed by spraying tin oxide on a hot substrate. The difficulty with the tin oxide cold cathode fabricated by the aforedescribed method is that its emission is not stable. This obviates its use in devices which utilize cold cathodes such as solid state amplifiers.

SUMMARY OF THE INVENTION

The general object of this invention is to provide a method of fabricating a thin film tin oxide electron emitter cold cathode. A further object of the invention is to provide such a method that will result in a cold cathode characterized by stable emission. Another object of the invention is to provide such a method that will result in a cold cathode capable of delivering hundreds of milliamperes of current with an emission density in the order of several amperes per square centimeter at efficiencies in excess of 20 percent.

It has now been found that the foregoing objects can be attained by placing an N-type monocrystalline substrate of about 100 to about 500 microns in thickness in a furnace. The furnace is heated to about 850° C. to about 900° C. and an N-type layer of about 10 to 15 microns of tin oxide deposited onto the top surface of the substrate. Then, a P-type layer of about 10 microns in thickness of $SnO_2$ is deposited on the N-type layer. The furnace is then cooled at a rate of about 10° C. per minute to form the emitter. The furnace is then cooled to room temperature and the emitter removed from the furnace. The emitter is subjected to etching and polishing to obtain a P region thickness of about 2 to about 4 microns and a nonreactive metal contact is deposited on the P-type layer. The emitter is completed by bonding a metal contact to the base of the N-type monocrystalline substrate.

The N-type substrate is preferably a monocrystalline material such as $SnO_2$ or sapphire that has been doped with a suitable N-type dopant so that a preferred orientation can be obtained for the deposited emitter. However, other materials such as polycrystalline quartz, polycrystalline $SnO_2$, and polycrystalline sapphire can also be used as the substrate.

The $SnO_2$ to be deposited on the monocrystalline substrate as a film is first doped with a suitable N-type dopant such as antimony, arsenic, or phosphorus and then with a suitable P-type dopant such as indium, boron, aluminum or gallium. The deposition is carried out by such techniques as chemical vapor deposition, gas phase epitaxy, or sputtering.

The films or layers of N and P type $SnO_2$ constitute the actual emitter. The film thickness of the actual emitter is on the order of about 10 to about 100 microns. The P-film or layer is kept as thin as possible to avoid recombination of electrons which are released from the N-type materials. Deposition of the films or layers is carried out in a furnace that is operating at a temperature of about 850° to 900° C. During the actual formation of the emitter on the monocrystalline substrate, the temperature is allowed to slowly cool to about 600° C. at which time formation of the emitter is completed.

The nonreactive metal contact deposited on the P-type layer may be a material such as gold, molybdenum, moly-manganese silver or nickel. The metal contact bonded to the base of the N-type monocrystalline substrate may similarly be a material such as gold, molybdenum, moly-manganese silver or nickel.

DESCRIPTION OF THE PREFERRED EMBODIMENT

An N-type $SnO_2$ wafer of about 500 microns in thickness is placed in a boat in a furnace and the furnace heated to about 900° C. A liquid suspension of tin chloride solution $SnCl_4.5H_2O$ doped with antimony is then deposited in vapor form on the top surface of the hot wafer using nitrogen as a carrier gas to form an N-type layer of $SnO_2$ of about 15 microns in thickness. The deposition is then repeated except that indium is substituted for antimony as the dopant to obtain a P-type layer of $SnO_2$ of about 10 microns in thickness. The furnace is then cooled at a rate of about 10° C. per minute to about 600° C. to form the emitter. Then, the furnace is cooled to room temperature and the emitter removed from the furnace. The emitter is then subjected to etching and polishing to obtain a P-type layer thickness of about 4 microns. A gold contact is then deposited on the P-type layer. Then, a gold metal contact is ultrasonically bonded to the base of the N-type $SnO_2$ wafer. The emitter is then mounted in a vacuum apparatus and the apparatus then evacuated to $10^{-6}$ torr or less. Then, the emitter is heated to about 300° C. in the vacuum for a minimum of 4 hours or until the vacuum pressure is less than $3\times10^{-7}$ torr. The heating is then stopped and the emitter allowed to cool to room temperature. Then, the emitter is activated by applying a suitable voltage of about 35 to 125 volts bias across the emitter. Activation occurs when the emitter bias current drops sharply from tens of milliamps to hundreds of microamps.

Emission analysis is then made of the emitter. After the emitter current has aged or become stable, emitter efficiencies as high as 50 percent have been obtained at bias voltages from about 60 to 425 volts.

I wish it to be understood that I do not desire to be limited to the exact details shown and described, for obvious modifications will occur to a person skilled in the art.

What is claimed is:

1. Method of forming an efficient electron emitter cold cathode, said method including the steps of:
   - (a) placing an N-type substrate of about 100 to about 500 microns in thickness in a furnace,
   - (b) heating the furnace to about 850° C. to about 900° C. and depositing an N-type layer of about 10 to 15 microns of $SnO_2$ onto the top surface of said substrate,
   - (c) depositing a P-type layer of about 10 microns of $SnO_2$ on said N-type layer,
   - (d) cooling the furnace at a rate of about 10° C. per minute to about 600° C. to form the emitter,
   - (e) cooling the furnace to room temperature and removing the emitter from the furnace, (f) subjecting the P-type layer to etching and polishing to obtain a P-type layer thickness of about 2 to about 4 microns, (g) depositing a nonreactive metal contact on said P-type layer, and (h) bonding a metal contact to the base of the N-type monocrystalline substrate.

2. Method according to claim 1 wherein said N-type layer of $SnO_2$ is obtained by doping with a member of the group consisting of antimony, arsenic, and phosphorus.

3. Method according to claim 2 wherein said N-type layer of $SnO_2$ is obtained by doping with antimony.

4. Method according to claim 2 wherein said N-type layer of $SnO_2$ is obtained by doping with arsenic.

5. Method according to claim 2 wherein said N-type layer of $SnO_2$ is obtained by doping with phosphorus.

6. Method according to claim 1 wherein said P-type layer of $SnO_2$ is obtained by doping with a member of the group consisting of indium, boron, aluminum, and gallium.

7. Method according to claim 6 wherein said P-type layer of $SnO_2$ is obtained by doping with indium.

8. Method according to claim 6 wherein said P-type layer of $SnO_2$ is obtained by doping with boron.

9. Method according to claim 6 wherein said P-type layer of $SnO_2$ is obtained by doping with aluminum.

10. Method according to claim 6 wherein said P-type layer of $SnO_2$ is obtained by doping with gallium.

11. Method according to claim 1 wherein said N-type layer of $SnO_2$ is obtained by doping with antimony and wherein said P-type layer of $SnO_2$ is obtained by doping with indium.

12. Method according to claim 1 wherein said N and P type layers are deposited by chemical vapor deposition.

13. Method according to claim 1 wherein said N and P type layers are deposited by vapor phase epitaxy.

14. Method according to claim 1 wherein said N and P type layers are deposited by sputtering.

15. Method according to claim 1 wherein said substrate is monocrystalline.

16. Method according to claim 15 wherein said monocrystalline substrate is selected from the group consisting of $SnO_2$ and sapphire.

17. Method according to claim 16 wherein said monocrystalline substrate is $SnO_2$.

18. Method according to claim 16 wherein said monocrystalline substrate is sapphire.

19. Method according to claim 1 wherein said substrate is polycrystalline.

20. Method according to claim 19 wherein said polycrystalline substrate is selected from the group consisting of polycrystalline quartz, polycrystalline $SnO_2$, and polycrystalline sapphire.

21. Method according to claim 20 wherein said polycrystalline substrate is polycrystalline quartz.

22. Method according to claim 20 wherein said polycrystalline substrate is polycrystalline $SnO_2$.

23. Method according to claim 20 wherein said polycrystalline substrate is polycrystalline sapphire.

24. Method according to claim 1 wherein the metal contact is selected from the group consisting of gold, molybdenum, moly-manganese silver, and nickel.

25. Method according to claim 24 wherein the metal contact is gold.

26. Method according to claim 24 wherein the metal contact is molybdenum.

27. Method according to claim 24 wherein the metal contact is moly-manganese silver.

28. Method according to claim 24 wherein the metal contact is nickel.

29. Method of forming an efficient electron emitter cold cathode, said method including the steps of:

(a) placing an N-type wafer of $SnO_2$ of about 500 microns in thickness in a furnace, (b) heating the furnace to about 900° C. and depositing in vapor form on the top surface of the wafer a liquid suspension of tin chloride pentahydrate doped with antimony using nitrogen as a carrier gas to form an N-type layer of $SnO_2$ of about 15 microns in thickness, (c) depositing a liquid suspension of tin chloride pentahydrate doped with indium in vapor form on the N-type layer using nitrogen as a carrier gas to form a P-type layer of $SnO_2$ of about 10 microns in thickness, (d) cooling the furnace at a rate of about 10° C. per minute to about 600° C. to form the emitter, (e) cooling the furnace to room temperature and removing the emitter from the furnace, (f) subjecting the emitter to etching and polishing to obtain a P-type layer thickness of about 4 microns, (g) depositing a gold contact on the P-type layer, and (f) ultrasonically bonding a gold metal contact to the base of the N-type $SnO_2$ wafer.

* * * * *